Aug. 17, 1926.
G. GRIFFIN
1,596,098
VEHICLE TRANSMISSION
Filed Feb. 12, 1925
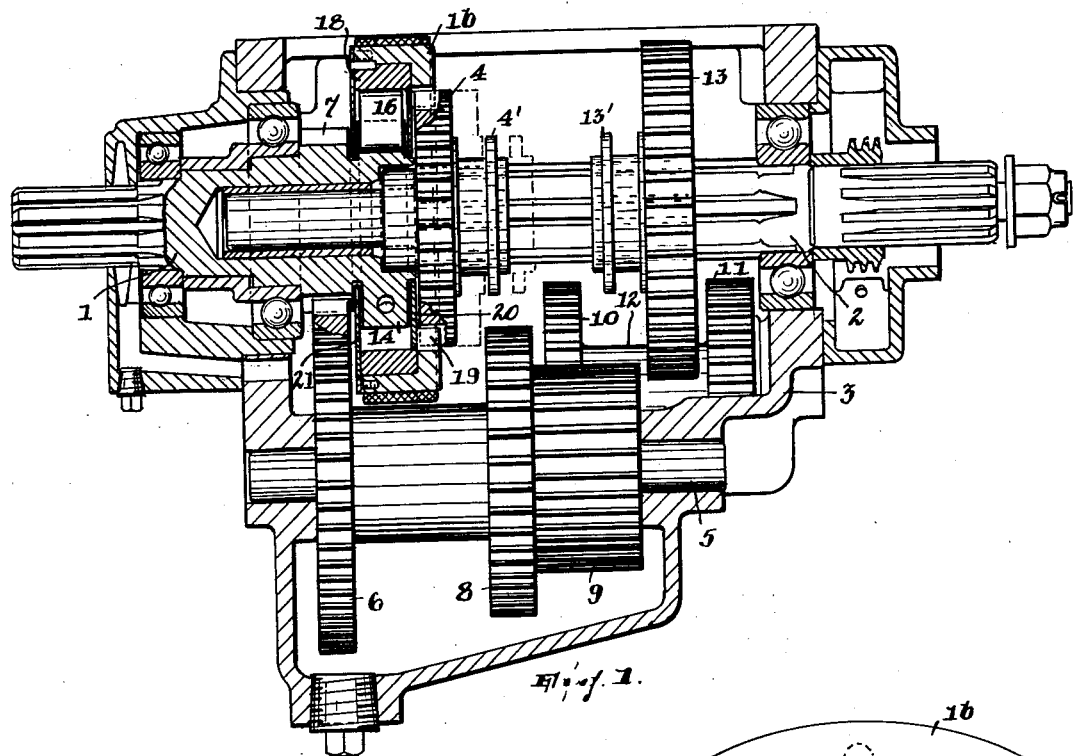
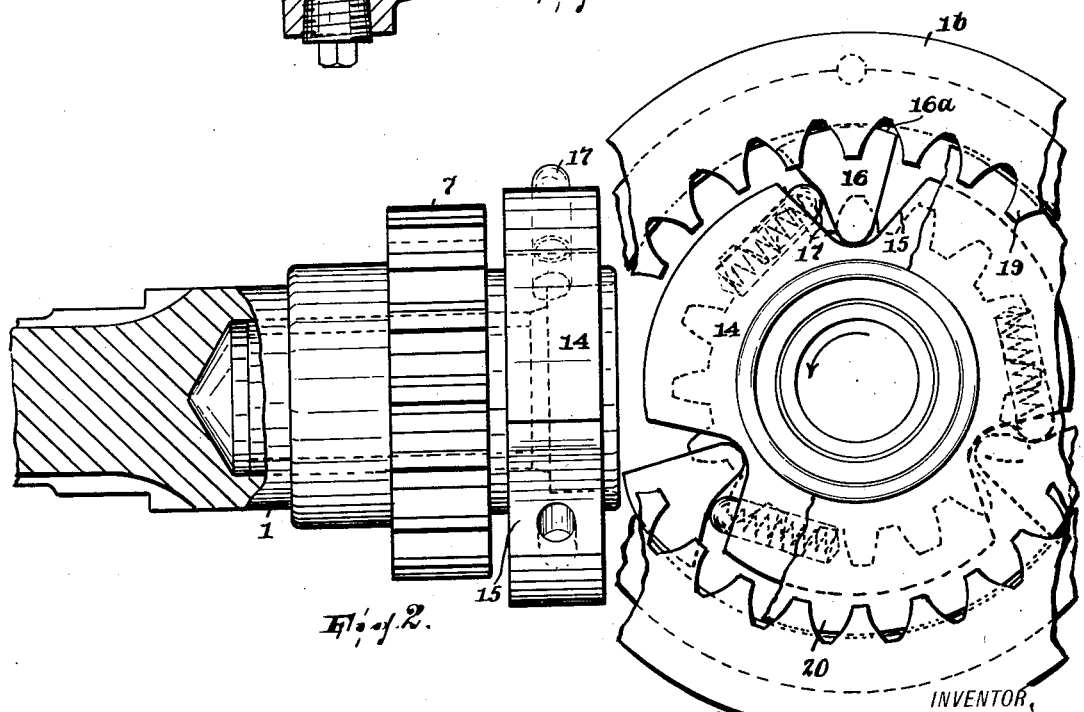
WITNESS
Wm L Bell
INVENTOR,
George Griffin,
ATTORNEY Patented Aug. 17, 1926.

1,596,098

UNITED STATES PATENT OFFICE.

GEORGE GRIFFIN, OF PATERSON, NEW JERSEY.

VEHICLE TRANSMISSION.

Application filed February 12, 1925. Serial No. 8,646.

This invention relates to transmission mechanisms for automobiles and it consists in the combination of higher speed transmission means including, with fore and aft portions disconnectively coupled together, an over-run clutch whereby the driven end of said means may over-run the driving end thereof, and lower speed means operative at will to transmit power to the aft portion from the fore portion around the coupling and clutch, said lower speed means when operative confining each portion against rotation relatively to the other in each direction. The invention has for its object to provide a transmission mechanism whose use will result in very great saving of fuel, wear and tear on and fouling of the engine, and other advantages by the automatic disconnection of the engine from the vehicle when, in the higher speed state of the transmission mechanism, some other force affords propulsion, as gravity when the vehicle is travelling forward down a hill, whereas the connection will remain established in the usual way for the purposes of safety when said mechanism is in a lower speed state, as first and second speeds forward, or reverse speed.

In the drawings, Fig. 1 is a longitudinal section of the improved mechanism; Fig. 2 a side elevation of the fore portion and other parts associated therewith; and Fig. 3 is a rear elevation of the over-run clutch.

In Figs. 1 to 3: 1 and 2 are the mentioned fore and aft portions of the higher speed transmission means journaled in the case 3 and adapted to be operatively connected by (gear-like) coupler 4 splined on portion 2. The lower speed transmission, for second speed, first speed and reverse, is as follows: A jack-shaft 5 has fixed thereon a gear 6, meshing permanently with a gear 7 on fore portion 1, a gear 8, with which the coupler 4 may engage to produce second speed, and a broad-faced gear 9 in permanent mesh with one of two spaced idler gears 10—11 on a countershaft 12, the aft portion 2 having splined thereon a gear 13 which when shifted into mesh with gear 9 produces first speed and when shifted into mesh with gear 11 produces reverse. Any well known means to selectively shift 4 and 13 forward and backward may be engaged with their collars 4' and 13'. The fore portion includes an over-run clutch, or is in two sections, one equipped with means to grip the other in such a manner that the relatively aft or driven section may turn forward but not backward with respect to the forward section. The driving section has a flange 14 with peripheral recesses 15 in which are fulcrumed dogs 16 having outer curved eccentric surfaces 16$^a$ and spring-pressed by devices 17 contrary to the direction of normal rotation of the driving section (Fig. 3). The driven section or over-run member of the clutch, marked 1$^b$ is annular, surrounding flange 14, and may contain a hardened ring 18 against whose inner periphery the dogs are spring-held. The operative connection between the fore and aft portions 1 and 2 is accomplished by engaging the coupler 4 with the section 1$^b$, which for this purpose has inside teeth 19 to mesh with the external teeth of the coupler. To hold the annular section 1$^b$ against shifting longitudinally a thin annular ring 20 overlaps its inner peripheral portion and flange 14 at the back and it has a thin annular ring 21 secured removably to its front face and overlapping said flange at the front.

When coupler 4 is engaged with the fore portion 1 (full-line position, Fig 1), the drive being then direct from 1 to 2, the aft portion may over-run the fore portion but will be driven by the latter whenever the former tends to lag. But when the coupler is disengaged and the transmission is indirect, or through the revoluble gear element formed by the jack-shaft and its gears, the portions 1 and 2 are positively connected against rotation relatively to each other in either direction.

Thus the lower speed means, when operative, transmits the power around the clutch as well as the coupling, so that at higher speed transmission there are the benefits incident to the use of an over-run clutch, with the aft portion positively locked to the fore portion against slippage in either direction at any lower speed transmission, the vehicle then remaining fully under control of the engine. The vehicle is moreover put in such a condition of control without any other operation than that of changing from the higher to a lower speed, the over-run clutch being cut out merely by such change; thus the mechanism is not complicated by the addition of any device whatever for the driver to operate.

Having thus fully described my invention, what I claim is:

In combination, alined revoluble driving and driven transmission portions, one including an over-run clutch having internal teeth in its over-run member, an externally toothed coupler splined on the other of said portions, and a revoluble gear element intergeared with the first-named portion and having a gear, the coupler being movable lengthwise of its spline in one direction into mesh with the teeth of said member and in the other direction into mesh with said gear.

In testimony whereof I affix my signature.

GEORGE GRIFFIN.